(12) United States Patent
Navarro Fructuoso et al.

(10) Patent No.: US 11,630,247 B2
(45) Date of Patent: Apr. 18, 2023

(54) VARIFOCAL OPTICAL SYSTEM

(71) Applicant: Huawei Technologies Co., Ltd., Shenzhen (CN)

(72) Inventors: Hector Navarro Fructuoso, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 454 days.

(21) Appl. No.: 16/842,494

(22) Filed: Apr. 7, 2020

(65) Prior Publication Data

US 2020/0233120 A1 Jul. 23, 2020

Related U.S. Application Data

(63) Continuation of application No. PCT/EP2017/075657, filed on Oct. 9, 2017.

(51) Int. Cl.
*G02B 3/14* (2006.01)
*G02B 27/01* (2006.01)

(52) U.S. Cl.
CPC .......... *G02B 3/14* (2013.01); *G02B 27/0179* (2013.01); *G02B 2027/0185* (2013.01)

(58) Field of Classification Search
CPC .......... G02B 3/12–3/14; G02B 3/0062; G02B 27/0179; G02B 2027/0185; H04N 13/395
USPC .................................................. 359/665–667
See application file for complete search history.

(56) References Cited

U.S. PATENT DOCUMENTS

| | | | |
|---|---|---|---|
| 5,880,711 A | 3/1999 | Tamada | |
| 7,536,093 B2 * | 5/2009 | Kita | G02B 3/14 396/89 |
| 8,687,281 B2 * | 4/2014 | Jannard | G02B 26/004 359/557 |
| 8,854,423 B2 * | 10/2014 | Batchko | H04N 13/305 348/40 |
| 10,261,309 B2 * | 4/2019 | Tseng | G02B 3/14 |
| 2004/0114203 A1 | 6/2004 | Batchko | |
| 2006/0232498 A1 | 10/2006 | Seo et al. | |
| 2007/0263293 A1 | 11/2007 | Batchko et al. | |

(Continued)

FOREIGN PATENT DOCUMENTS

| | | |
|---|---|---|
| EP | 3226558 A1 | 10/2017 |
| WO | 0233657 A2 | 4/2002 |

OTHER PUBLICATIONS

Maffli, L., Rosset, S., Ghilardi, M., Carpi, F. and Shea, H. (2015), Ultrafast All-Polymer Electrically Tunable Silicone Lenses. Adv. Funct. Mater., 25: 1656-1665. https://doi.org/10.1002/adfm.201403942 (Year: 2015).*

(Continued)

*Primary Examiner* — Zachary W Wilkes
(74) *Attorney, Agent, or Firm* — Leydig, Voit & Mayer, Ltd.

(57) ABSTRACT

A focus tunable optical system includes a lens assembly. The lens assembly includes: focus tunable lenses (FTLs) coaxially disposed along an optical axis, each FTL contributing to an optical power of the lens assembly; and a controller configured to control the optical power of the lens assembly by applying to each FTL a respective control signal, thereby generating a periodic optical response of the respective FTL. The optical response of each FTL is substantially different from the optical response of any other FTL of the plurality of FTLs.

14 Claims, 9 Drawing Sheets

(56) References Cited

U.S. PATENT DOCUMENTS

| | | | | |
|---|---|---|---|---|
| 2009/0284489 | A1* | 11/2009 | Batchko | H04N 13/395 359/290 |
| 2012/0281272 | A1* | 11/2012 | Arnold | G02F 1/33 359/305 |
| 2013/0063805 | A1* | 3/2013 | Arnold | G02B 3/14 359/305 |
| 2020/0192080 | A1* | 6/2020 | Karam | G02B 27/0068 |
| 2021/0364817 | A1* | 11/2021 | Bhagavatula | G06F 3/147 |

OTHER PUBLICATIONS

Li, H.; Cheng, X.; Hao, Q. An Electrically Tunable Zoom System Using Liquid Lenses. Sensors 2016, 16, 45. https://doi.org/10.3390/s16010045 (Year: 2016).*

"Fast Electrically Tunable Lens EL-10-30 Series," XP055484804, total 16 pages, Retrieved from the Internet: URL https://www.stemmer-imaging.de/media/uploads/optics/10/102966-Optotune-EL-10-30.pdf, Optotune (Apr. 4, 2016).

"DLP Technology for Near Eye Display—White Paper," total 17 pages, Texas Instruments Incorporated (Sep. 2014).

Kramida, "Resolving the Vergence-Accommodation Conflict in Head-Mounted Displays," IEEE Transactions on Visualization and Computer Graphics, vol. 22, No. 7, pp. 1912-1931, Institute of Electrical and Electronics Engineers, New York, New York (Jul. 2016).

Lambooij et al.,"Visual Discomfort and Visual Fatigue of Stereoscopic Display: A Review," Journal of Imaging Science and Technology, vol. 53, No. 3, pp. 1-14 (2009).

Hu et al., "Design and Assessment of a Depth-Fused Multi-Focal-Plane Display Prototype," Journal of Display Technology, vol. 10. No. 4, pp. 308-316 (Apr. 2014).

Wu et al.,"Content-Adaptive Focus Configuration for Near-Eye Multi-Focal Displays," 2016 IEEE Intl. Conf. on Multimedia and Expo (ICME), pp. 1-6, Institute of Electrical and Electronics Engineers, New York, New York (Jul. 2016).

Narain et al., "Optimal Presentation of Imagery with Focus Cues on Multi-Plane Displays," in ACM Transactions on Graphics, vol. 34, No. 4, Article 59, pp. 1-12 (Aug. 2015).

"Fast Electrically Tunable Lens EL-10-30-Series," Datasheet: EL-10-30-Series, pp. 1-16, Optotune (Jan. 4, 2017).

Shibata et al., "The zone of comfort: Predicting visual discomfort with stereo displays," in J. Vis., 2011; 11(8): 11. doi: 10.1167/11.8.11, pp. 1-53 (Jul. 2011).

TI training and videos >Applications and designs, Retrieved from the internet:http://www.ti.com/general/docs/video/watch.tsp?entryid=5157963226001, pp. 1-2, Retrieved on: Mar. 18, 2020.

Sommerich, "How DLP Works," Tutorial, pp. 64-65, AV Asia Pacific Magazine (2009).

"Principles of Time Domain Imaging," pp. 1-19, Forth Dimension Displays Limited, United Kingdom (Dec. 19, 2013).

\* cited by examiner

800

801 — Control an optical power of a lens assembly, which comprises a plurality of focus tunable lenses, FTLs, coaxially disposed along an optical axis of the lens assembly.

802 — Apply to each FTL a respective control signal, thereby generating a periodic optical response of the respective FTL, wherein the optical response of each FTL contributes to the optical power of the lens assembly and is substantially different from the optical response from any other FTL of the plurality of FTLs.

FIG. 8

VARIFOCAL OPTICAL SYSTEM

CROSS-REFERENCE TO RELATED APPLICATIONS

This application is a continuation of International Application No. PCT/EP2017/075657, filed on Oct. 9, 2017, which is hereby incorporated by reference in its entirety.

FIELD

The disclosure relates to a device and a method for controlling an assembly of focus tunable lenses (FTL). The device and method enhance the optical response of a focus tunable optical system, e.g., a Multifocal Plane Display (MFD).

BACKGROUND

Multi-focal-plane near eye displays (MFD) have recently emerged as display devices (e.g., head-mounted displays) for volumetric 3D rendering. Volumetric 3D rendering can alleviate visual discomfort that may arise with some other types of near eye displays (NEDs), e.g., with stereoscopic 3D displays which render depth perception of 3D scenes from pairs of 2D perspective images with binocular disparities presented at a fixed distance (focal plane) to the viewer. The fixed distance creates an unnatural viewing condition and causes a Vergence-Accommodation Conflict (VAC) with adverse consequences, such as visual discomfort, fatigue, or distorted depth perception.

Multiple carefully placed, discrete focal planes divide an extended 3D scene volume into multiple zones along the visual axis. Virtual objects within a zone are rendered by the corresponding pair of adjacent focal planes such that the 2D perspective images of these objects are displayed at a nearly correct focal distance.

MFD implementations can be categorized into spatially multiplexed or temporally/time multiplexed techniques. In the time multiplexed systems, the viewing distance of a single 2D display from the eye is rapidly switched in synchronization with the rendering of frames of multiple focal planes to create a flicker-free perception. In order to perform the focal plane switching high-speed Focal Modulator Elements utilizing variable power lenses or focus tunable lenses are employed to continuously adjust and/or modulate the focal length (or, equivalently, the optical power) of, e.g., electrically tunable lens or deformable membrane mirror devices (DMMD). A focal modulator element may be implemented in the form of a shape-changing lens. The lens may comprise a container, which is filled with an optical fluid and sealed off with, e.g., an elastic polymer membrane. An electrical current (e.g., flowing through a coil of an actuator of the lens) may be used to control the deflection of the lens and thus the focal distance of the lens. A plurality of optical power levels (and thus a corresponding plurality of focal planes, e.g., 4 focal planes) can be generated by applying a control signal (e.g., an electrical current) that takes the form of a step function, each value of the step function representing a corresponding current level and thus a corresponding optical power level.

However, a multi-focal display system of the above described kind may suffer from artifacts related to inertia of the Focal Modulator Elements, e.g., as illustrated in FIG. 2. An example of lens inertia is highlighted in "*Datasheet: EL-10-30-Series, Fast Electrically Tunable Lens, Optotune*, January 2017". Due to lens inertia, an oscillation artifact (notably, overshoot and ringing) may appear in the optical response. The oscillation artifact may be characterized by a rise time and a settling time. This can produce a delay before the optical system reaches its steady-state period. This, in turn, may limit the maximum frame rate that can be achieved.

The problem may be alleviated by pre-processing or pre-compensating the control signal, to enhance the optical response of the variable optical power lense, e.g., as highlighted in "*Datasheet: EL-10-30-Series, Fast Electrically Tunable Lens, Optotune*, January 2017". More specifically, a shorter settling time may be achieved by removing resonant frequencies from the applied step function and by applying an overshooting step function.

SUMMARY

The disclosure provides an MFD system with an improved image rendering quality. The disclosure provides an improved optical system that has a reduction in the undesired effects of artifacts arising from lens inertia in the optical system.

An optical system of multiple closely cascaded FTLs is provided. The FTLs, e.g., electrically controlled liquid lenses, are placed separately and coaxially along an optical axis of an optical system. An improved optical step response is obtained by combining several optical responses produced by several FTLs, based on a Fourier decomposition of the desired ideal optical step response.

A first aspect of the disclosure provides a focus tunable optical system. The optical system includes a lens assembly, including a plurality of focus tunable lenses (FTLs), coaxially disposed along an optical axis. Each FTL contributes to an optical power of the lens assembly. The optical system further includes a controller configured to control the optical power of the lens assembly by applying to each FTL a respective control signal, thereby generating a periodic optical response of the respective FTL. The optical response of each FTL is substantially different from the optical response of any other FTL of the plurality of FTLs.

The different periodic optical responses of the FTLs lead to an improved total optical response of the lens assembly with less oscillation artifacts. For example, based on the Fourier decomposition of an ideal optical step response, an optical system of multiple FTLs can be constructed, whereby each FTL's optical response is a periodic function, which corresponds to one or more Fourier components of the ideal optical step response. The sum of the Fourier components is the desired optical step response.

Each control signal applied by the controller to each respective FTL may be a sinusoidal signal, a periodic sequence of pulses, a periodic staircase function, or a periodic saw tooth function, depending, for instance, on the number of Fourier components of the ideal optical step response one of the plurality of FTLs needs to reproduce. The optical power of the lens assembly, or any FTL in the lens assembly for that matter, is considered as a function of time and is referred to herein as the optical response. The statement that the optical response of an FTL is substantially different from that of any other FTL means that the two optical responses differ in a non-trivial manner, that is, they do not differ merely by an overall amplitude scaling factor or by a time shift.

In an implementation form of the first aspect, the optical response of an FTL comprises a natural frequency of the FTL.

In a further implementation form of the first aspect, the optical response of an FTL comprises a frequency lower than the natural frequency of the FTL.

The control signal for any FTL can generally be a periodic signal with a specific amplitude, frequency and phase lag. The control signal parameters current intensity, frequency and phase can be derived knowing the expected optical response. Driving an FTL at below its natural frequency (resonant frequency) has the advantage that only a low intensity (the lowest possible) is required and the phase shift is reduced.

In a further implementation form of the first aspect, the controller is configured to perform a Fourier analysis of a desired optical response and to generate for each or one or more of the FTLs the respective control signal in proportion to the sum of one or more Fourier components of the desired optical response.

In a further implementation form of the first aspect, each or one or more of the FTLs the optical response of the respective FTL comprises one or more Fourier components of the optical response of the lens assembly.

Due to practical constraints a limited number of FTLs may be disposed in an MFD to produce an optical response comprising a larger number of Fourier components. Subsequently the control signal for each FTL needs to take account of this and drive the FTL in proportion to the sum of one or more Fourier components of the optical response of the lens assembly.

In a further implementation form of the first aspect, the optical response of one of the FTLs comprises the lowest Fourier component of the optical response of the lens assembly (that is, the Fourier component with the lowest frequency).

In a further implementation form of the first aspect, for each or one or more of the FTLs the optical response of the respective FTL comprises only odd Fourier components or only even Fourier components of the optical response of the lens assembly.

In a further implementation form of the first aspect, for each or one or more of the FTLs the optical response of the respective FTL comprises less than 10, preferably less than 5, Fourier components of the optical response of the lens assembly.

In a further implementation form of the first aspect, the plurality of FTLs comprises a first, a second, and a third FTL. The optical response of the first FTL approximates a first sum of a number of Fourier components of the desired optical response of the lens assembly. The optical response of the second FTL approximates a second sum of a subset of the remainder of the Fourier components of the desired optical response of the lens assembly to compensate for a first residual of the first FTL. The optical response of the third FTL approximates a third sum of the remaining Fourier components of the desired optical response of the lens assembly to compensate for a second residual of the second FTL. The sum of the optical responses of the first, the second and the third FTLs approximates the desired optical response.

Above embodiments provide different ways of distributing the Fourier components of the optical response of the lens assembly over a limited number of FTLs.

In a further implementation form of the first aspect, the optical response of the lens assembly is a periodic staircase function or an approximation of a periodic staircase function.

A second aspect of the disclosure provides a multifocal display device, comprising a focus tunable optical system according to the first aspect or any of the implementation forms of the first aspect.

A third aspect of the disclosure provides a method for controlling a focus tunable optical system. The method includes: controlling an optical power of a lens assembly, which comprises a plurality of focus tunable lenses (FTLs), coaxially disposed along an optical axis of the lens assembly; and applying to each FTL a respective control signal, thereby generating a periodic optical response of the respective FTL. The optical response of each FTL contributes to the optical power of the lens assembly and is substantially different from the optical response from any other FTL of the plurality of FTLs.

In an implementation form of the third aspect, the optical response of an FTL comprises a natural frequency of the FTL.

In a further implementation form of the third aspect, the optical response of an FTL comprises a frequency lower than the natural frequency of the FTL.

In a further implementation form of the third aspect, the method comprises performing a Fourier analysis of a desired optical response and generating for each or one or more of the FTLs the respective control signal in proportion to the sum of one or more Fourier components of the desired optical response.

In a further implementation form of the third aspect, each or one or more of the FTLs the optical response of the respective FTL comprises one or more Fourier components of the optical response of the lens assembly.

In a further implementation form of the third aspect, the optical response of one of the FTLs comprises the lowest Fourier component of the optical response of the lens assembly.

In a further implementation form of the third aspect, for each or one or more of the FTLs the optical response of the respective FTL comprises only odd Fourier components or only even Fourier components of the optical response of the lens assembly.

In a further implementation form of the third aspect, for each or one or more of the FTLs the optical response of the respective FTL comprises less than 10, preferably less than 5, Fourier components of the optical response of the lens assembly.

In a further implementation form of the third aspect, the plurality of FTLs comprises a first, a second, and a third FTL. The optical response of the first FTL approximates a first sum of a number of Fourier components of the desired optical response of the lens assembly. The optical response of the second FTL approximates a second sum of a subset of the remainder of the Fourier components of the desired optical response of the lens assembly to compensate for a first residual of the first FTL. The optical response of the third FTL approximates a third sum of the remaining Fourier components of the desired optical response of the lens assembly to compensate for a second residual of the second FTL. The sum of the optical responses of the first, the second and the third FTLs approximates the desired optical response.

In a further implementation form of the third aspect, the optical response of the lens assembly is a periodic staircase function or an approximation of a periodic staircase function.

The method of the third aspect achieves all advantages and effects described above for the system of the first aspect.

A forth aspect of the disclosure provides a method for controlling a focus tunable computer program product comprising a program code for controlling a focus tunable optical system according to the first aspect or any implementation form thereof or a multifocal display device according to the second aspect.

Accordingly, with the computer program product of the forth aspect, the advantages and effects described for the device of the first or the second aspect can be achieved.

All devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity that performs that specific step or functionality. It should be clear for a skilled person that these methods and functionalities can be implemented in respective software or hardware elements, or any kind of combination thereof.

BRIEF DESCRIPTION OF THE DRAWINGS

The above described aspects and implementation forms of the disclosure will be explained in the following description of specific embodiments in relation to the enclosed drawings, in which:

FIG. 8 shows an example of a method according to an embodiment of the disclosure.

DETAILED DESCRIPTION

Figure 1:
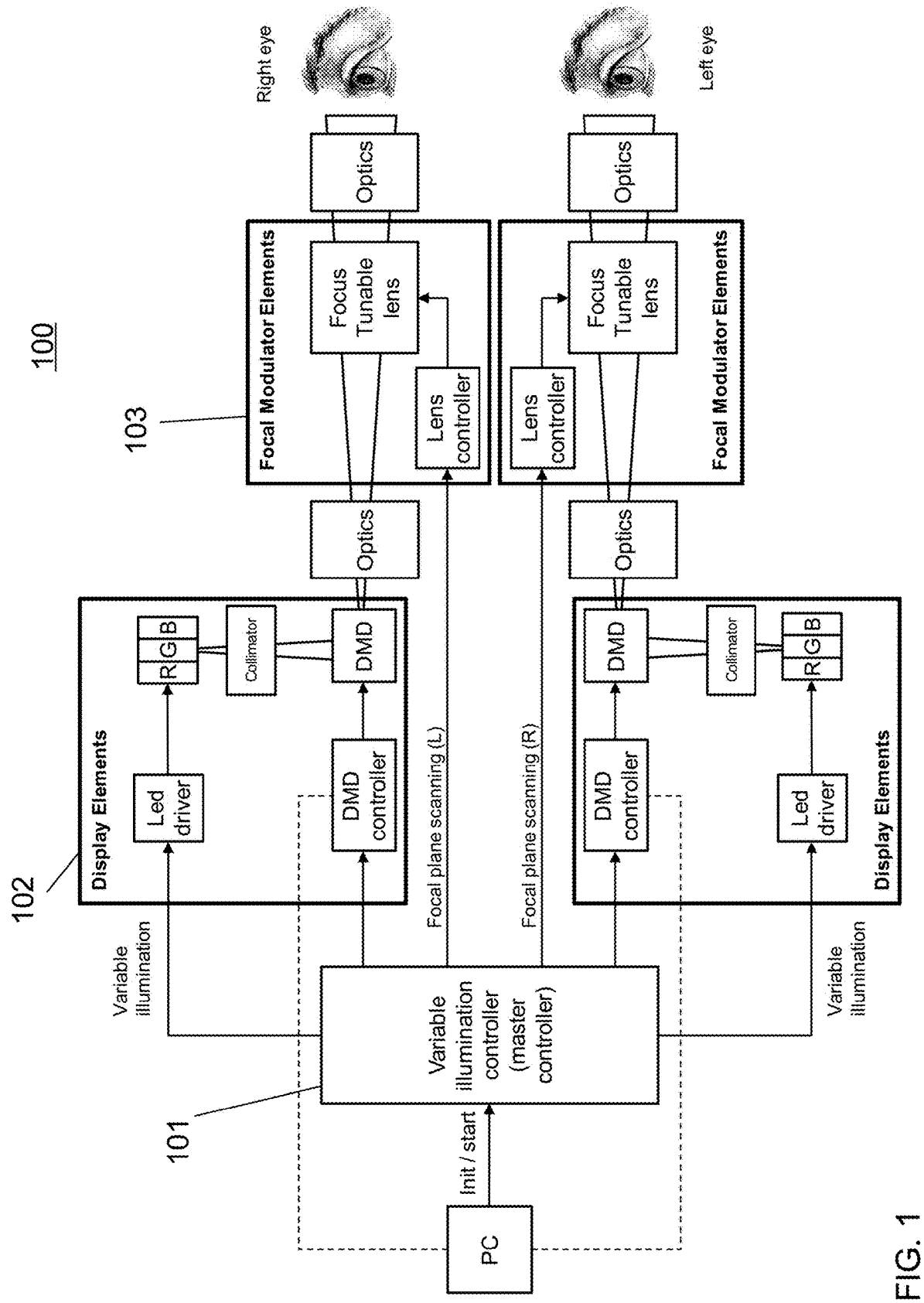
FIG. 1 shows an example of a multifocal display device.

Multifocal plane display (MFD) optical systems are related to near eye displays (NED) or near-to-eye (NTE) applications or devices. An example of such a device 100 is shown in FIG. 1. MFD implementations can be categorized into spatially multiplexed or temporally/time multiplexed techniques. In a time multiplexed system as shown for the device 100 in FIG. 1, the viewing distance of a single 2D display from the eye is rapidly switched in synchronization with the rendering of frames of multiple focal planes to create a flicker-free perception. Such a device 100 uses ultrafast display elements 102 to sequentially display color images at a flicker fusion threshold speed (>=60 Hz frame rate), e.g. a Digital Micromirror Device (DMD) or Ferroelectric Liquid Crystal on Silicon (FLCoS). The next building blocks are high-speed focal modulator (or varifocal) elements 103, utilizing variable power lenses to continuously adjust or modulate the focal length or optical power, e.g. electrically tunable lenses or focus tunable lenses (FTL) and deformable membrane mirror devices (DMMD). MFD optical systems can provide a good balance between image quality and ease of implementation while alleviating VAC and enabling true volumetric 3D rendering.

Figure 2:
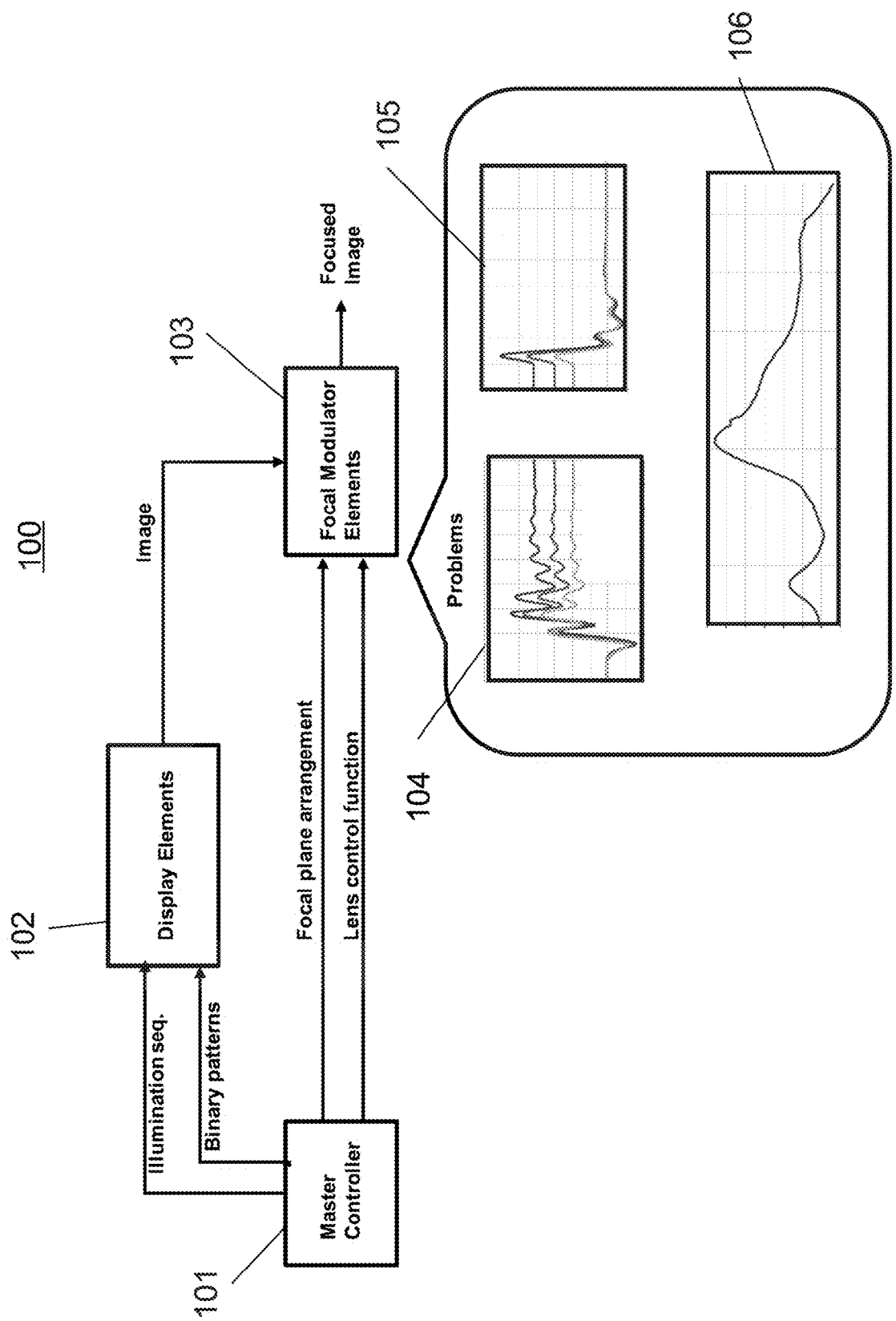
FIG. 2 shows a control path of a multifocal display device.
Figure 9:
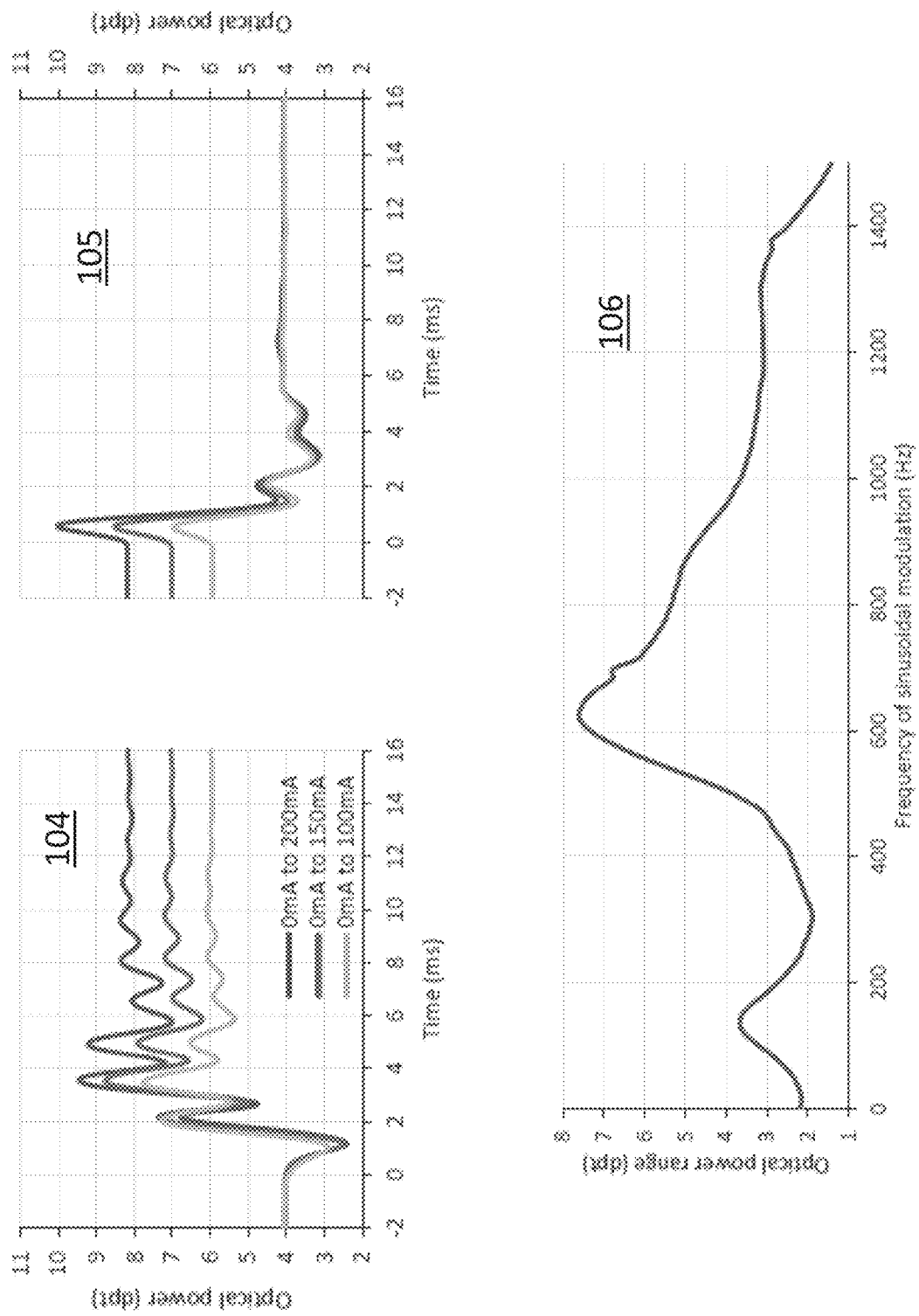
FIG. 9 shows an enlarged view of the step-up situation, the step-down situation, and the frequency spectrum from FIG. 2.

The MFD device 100 shown in FIG. 2 comprises a Master Controller 101, Display Elements 102 and Focal Modulator Elements 103 for generating a focused image for 3D perception. The Master controller 101 produces a signal of a certain current intensity to control the Focal Modulator Elements 103. The Focal Modulator Elements 103 use focus tunable lenses (FTL), wherein the optical power of the FTLs is adjusted by the control signal. In order to generate several optical power levels (e.g., 4 such levels, corresponding to 4 focal planes), a control signal in the form of a step current is applied along a lens control function path. However, due to lens inertia a significant oscillation artifact (overshoot+ringing) appears in the optical response of the FTLs, which is characterized by certain periods of oscillating perturbations like rise and settling times, which occur in a step-up 104 or step-down 105 situation, when the optical power of the FTL needs to be increased 104 or decreased 103 by a certain amount in order to jump to a different focal plane. Depending on the physical properties of the FTL, the FTLs behave like a resonant circuit, which naturally exhibit characteristic resonance frequencies visible as peaks in the frequency spectrum 106 of a typical FTL. FIG. 9 shows an enlarged view of the step-up situation, the step-down situation, and the frequency spectrum from FIG. 2.

Figure 3:
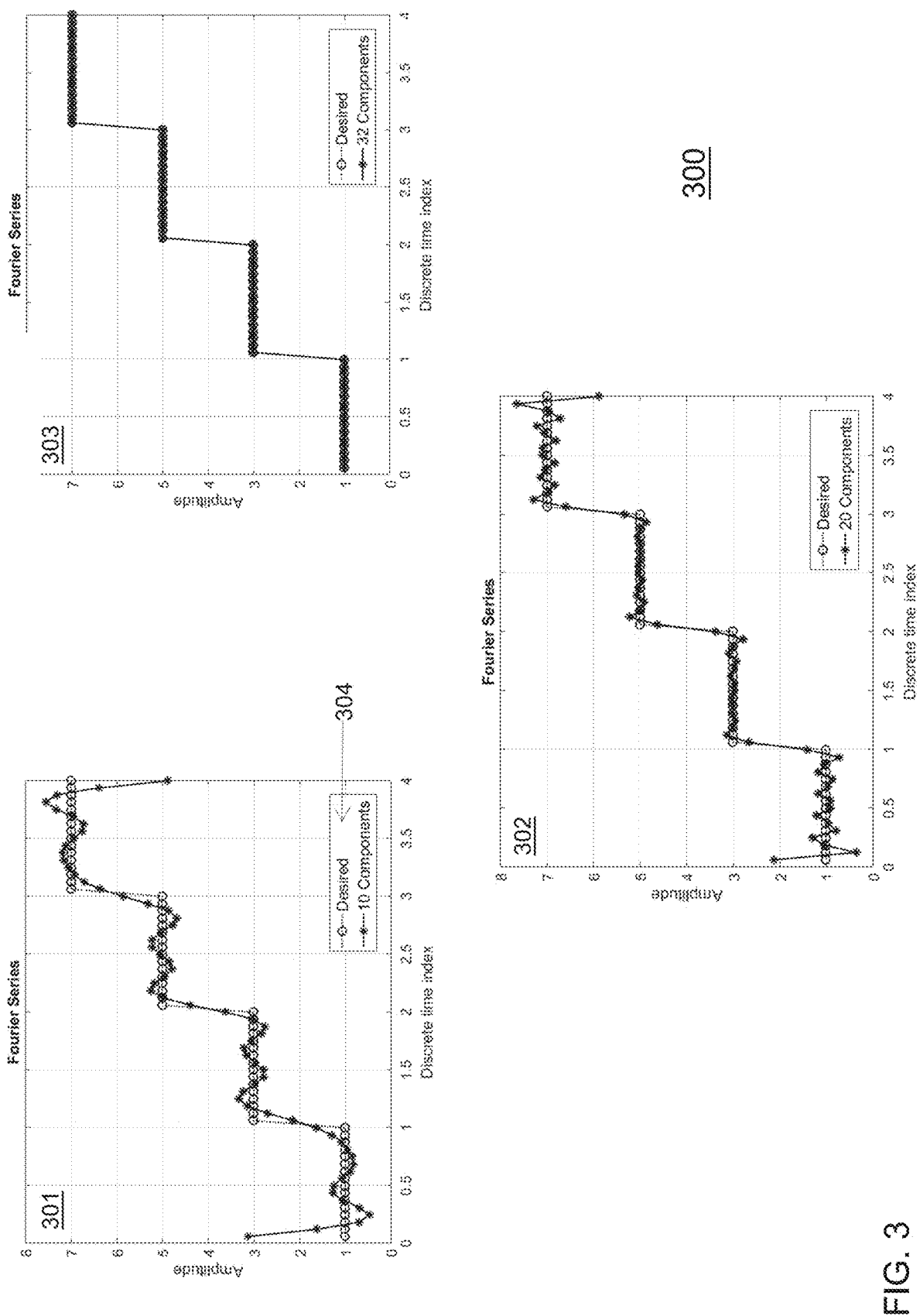
FIG. 3 shows an example of an optical staircase response of a lens assembly according to an embodiment of the disclosure.

Described below is an optical system of multiple, closely coaxially disposed and separately controlled FTLs, designed to remedy at least some of the shortcomings mentioned above. The optical system will suffer less from oscillation artifacts, as can be seen in FIG. 3, as each of the multiple FTLs is driven by a control signal comprising only a particular frequency of interest. In this example, each lens is driven with its proper frequency (i.e. its free oscillation or fundamental frequency). This can be done by driving the FTL with a sinusoidal signal having a frequency equal to the fundamental frequency (i.e. the first harmonic) of the FTL. The combination of the optical responses of each of the sinusoidally driven FTLs then provides an ideal optical step response 303 or at least a much improved approximation 301, 302 of the desired ideal step response 304 of the optical system by technically applying the principle of Fourier Series and the harmonic oscillator in combination with (multiple) cascaded FTLs. Ideally, based on the Fourier decomposition of the ideal optical step response, an optical system of multiple FTLs can be constructed, whereby each FTL's optical response shall resemble a sinusoidal basis function, which corresponds to each Fourier component. The sum of these Fourier components guarantees the generation or at least close approximation of the desired ideal optical step response.

An additional benefit of this arrangement lies in the fact that the undesirable delay of an optical system driven by instant changes of control signals can also be reduced. As a consequence, faster focal scanning rates, higher frame rates or the ability to accommodate more focal planes can be achieved.

FIG. 3 shows the construction 300 of such an optical system according to an embodiment of the disclosure by employing up to 32 Fourier components, which corresponds to 32 FTLs, in order to obtain an ideal 303 or at least a much improved approximated step response 301, 302. The required number of Fourier components can certainly be reduced by employing a better desired optical step response, e.g., by having a symmetric staircase function which reduces the needed number of high frequency components.

Figure 4:
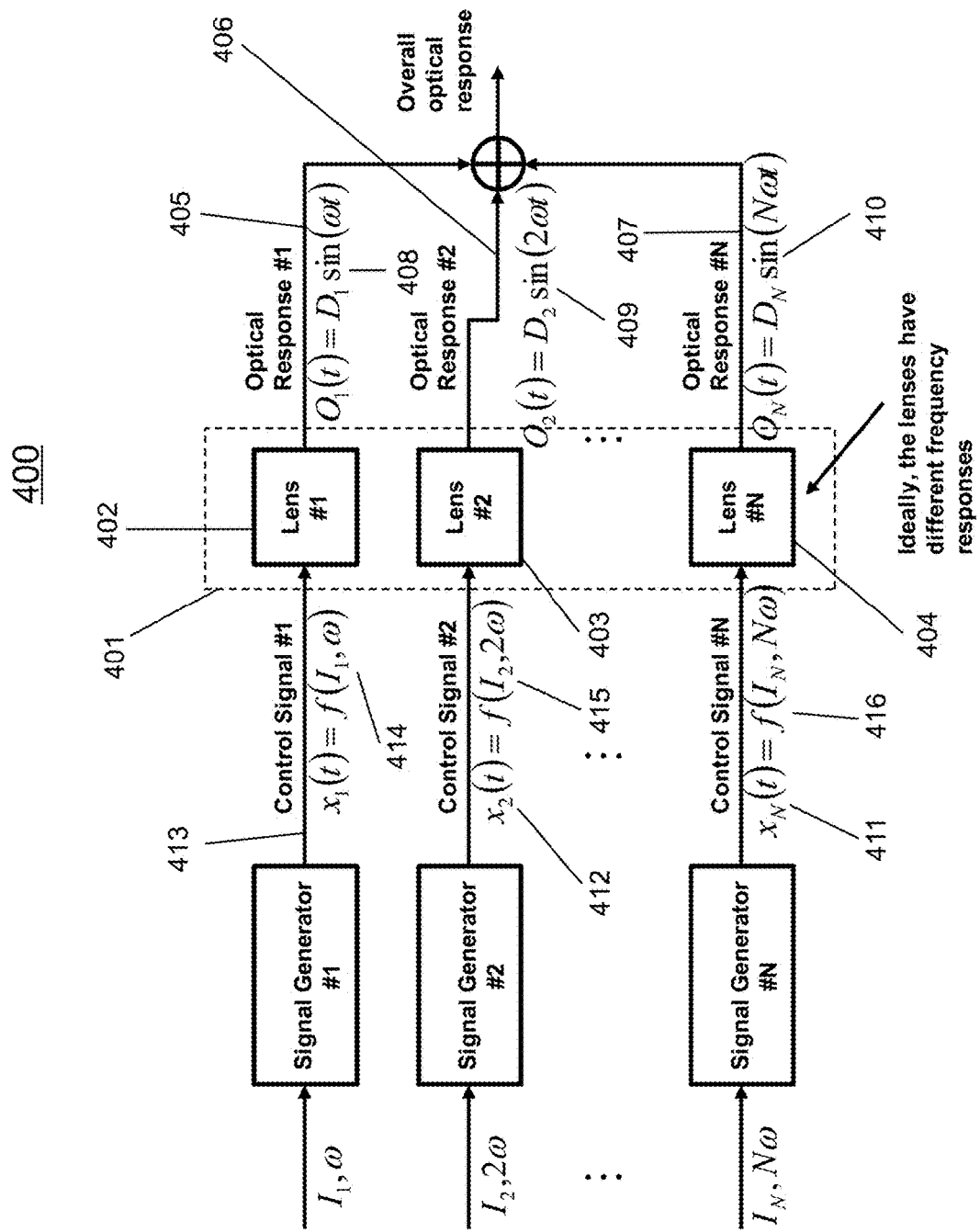
FIG. 4 shows an example of a lens assembly according to an embodiment of the present disclosure.

FIG. 4 shows a block diagram 400 of a corresponding embodiment of such an optical system of multiple FTLs 401. Based on the principle of Fourier Series, any periodic signal (in this case the ideal step optical response) can be decomposed into a set of oscillating functions namely sinusoidal signals 408, 409, 410. The Fourier decomposition gives a set of amplitudes $D_j$ indicating optical power measured in diopter and frequencies $\omega_j = j*\omega$, where $j=1, \ldots, N$, whereby in this technical context the amplitude and the frequency is the amplitude and frequency of the optical response $O_j$ 405, 406, 407 of each FTL and frequency $j*\omega$, whereby for illustrative purposes only "Lens #1" 402, "Lens #2" 403 and "Lens # N" 404 and their respective frequencies $\omega$, $2\omega$ and $N\omega$ are shown.

During the design process, a set of FTLs 402, 403, 404 may be chosen or manufactured to satisfy the requirement that each FTL has to yield an optical response 405, 406, 407, which oscillates at its respective frequency $\omega_j$ according to the given Fourier decomposition. This is highly related to the FTL's properties (e.g., the diameter, fluid pump mechanism), which can be analyzed by its frequency response. Assuming, for example, differently sized FTLs, each FTL will then have a different frequency response and the desired control signal is decomposed so each FTL handles different frequency components (bigger FTLs handle lower frequency components, and vice versa). Knowing the frequency response of each FTL, a respective oscillating control signal 411, 412, 413 with frequency $\omega_j$ is generated. The frequency $\omega_j$ matches the fundamental frequency (also referred to herein as the lowest resonance or as the natural frequency) of the respective FTL, i.e. the lens is operated at resonance. Proper shaping of the FTL can thus be ensured. At higher resonances, the FTL will have an unwanted shape (not lens-like anymore). The current intensity $I_j$ 414, 415, 416 may be further tuned to adjust the optical power $D_j$ because both values are proportional to each other. In this embodiment it is assumed that the system delay is negligible or that there is a similar delay in each branch, which will easily be the case if each FTL is driven at its resonant frequency. This guarantees that the branches oscillate in phase with each other.

Figure 5:
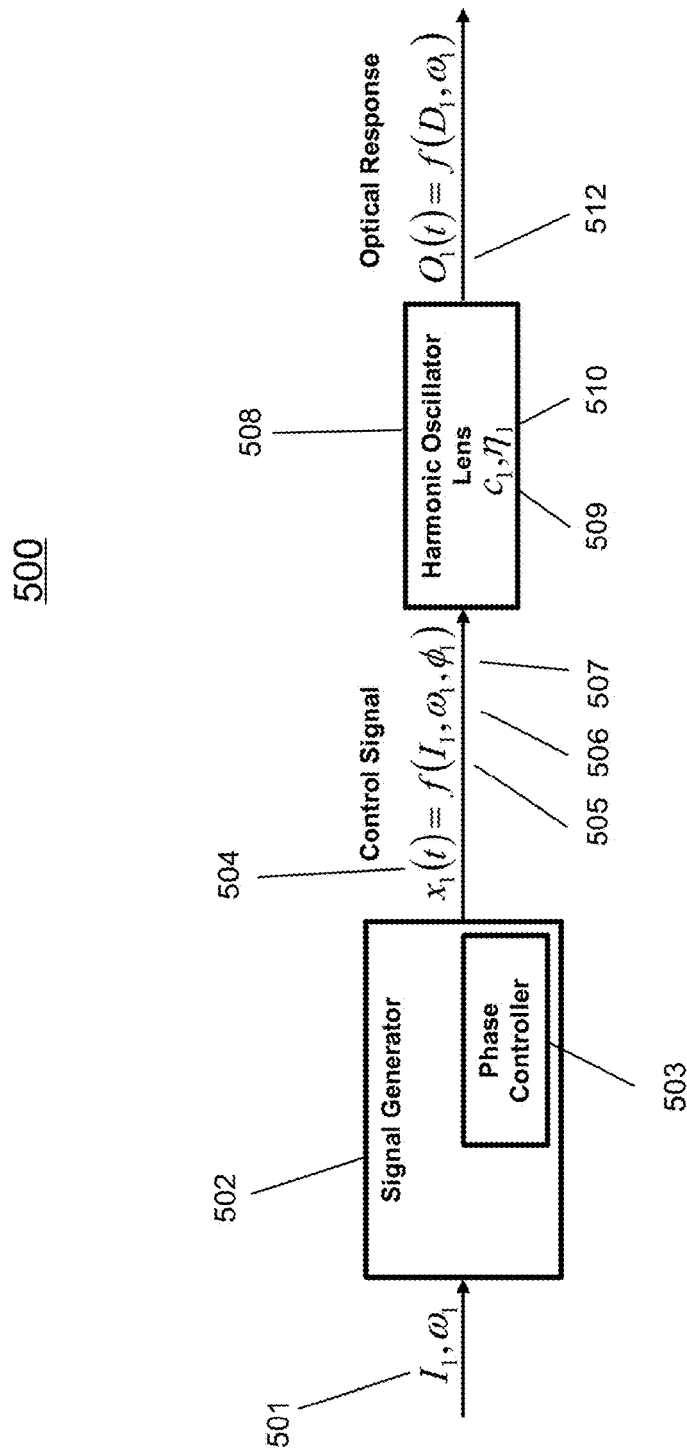
FIG. 5 shows an example of a signal path of an FTL according to an embodiment of the disclosure.

Alternatively, a compound lens comprising multiple FTLs can also be realized by considering that an FTL may be driven 501 by a frequency $\omega_j$ 506 other than its natural frequency $\eta_j$ 510 as shown in FIG. 5. Considering an FTL as a harmonic oscillator 508 with a damping factor $c_j$ 509 and a natural frequency $\eta_j$ 510, the lens control signal 504 can generally be a periodic signal. The periodic control signal may oscillate with an amplitude $I_j$ 505, a frequency $\omega_j$ 506, and a phase lag $\phi_j$ 507 between the control signal 504 and the optical response 512, depending on the difference between the frequency of the driving control signal $\omega_j$ 506 and the natural frequency 510 of each respective FTL 508. The control signal parameters $I_j$ 505, $\omega_j$ 506, and $\phi_j$ 507 for the control signal $x_j(t)$ 504 for each FTL 508 can be derived knowing the expected optical response output using the well-known function of the (driven) harmonic oscillator function: $f(D_j, \omega_j, c_j, \eta_j)$, where $D_j$ is the amplitude of the optical response output in dioptre. Hence, the design task is reduced to finding an FTL 508 having the parameters $c_j$ 509 and $\eta_j$ 510, whereby the FTLs natural frequency $\eta_j$ 510 is not necessarily the frequency $\omega_j$ 506, at which it is driven 501, 504 to produce the actual optical response 512, which is the corresponding Fourier component.

FIG. 5 depicts this scenario by identifying one single branch 500 of the complete lens assembly as shown in FIG. 4. In order to accommodate the mutual phase lags 507 of the optical responses 512, a phase controller 503 is disposed, which "harmonizes" the optical responses of each FTL by correcting their respective control signal 504 to achieve that all optical responses 512 are in-phase.

In an embodiment, one or more or all FTLs are driven well below their respective natural frequency $\eta_j$ (resonant frequency), which has the advantage that only a low intensity (the lowest possible) is required and the phase shift is minimum (approaching zero).

However, the basic idea of having a pure sinusoidal optical response on each FTL may not be desired in practice if there is not a way to optimally construct and assemble the FTLs to fit into a device, especially if the number of lenses is big, e.g., 32 lenses. To overcome such a problem, there are several alternative embodiments available which will only use few FTLs (2 or 3 FTLs).

Figure 6:
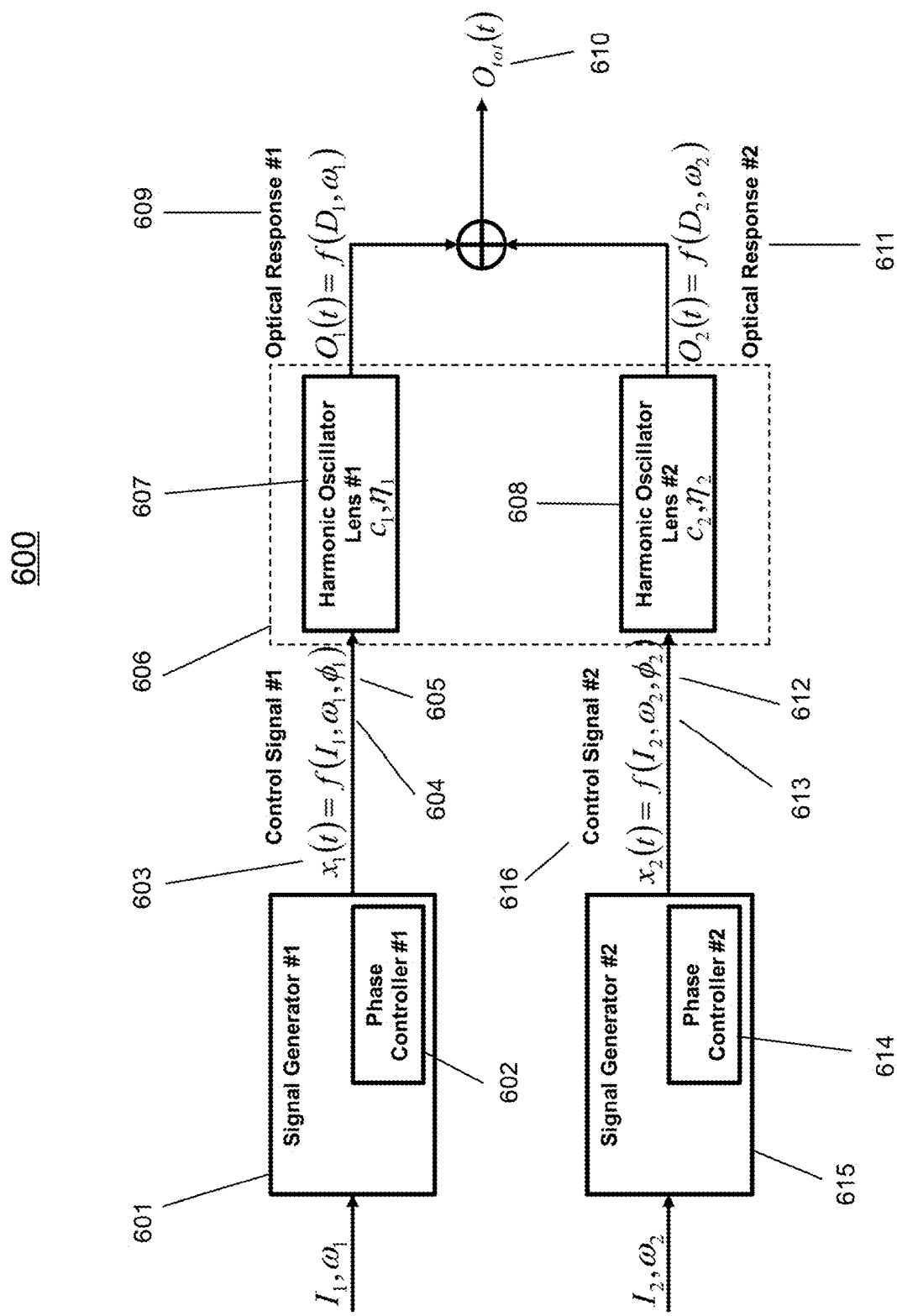
FIG. 6 shows an example of a lens assembly of two FTLs according to an embodiment of the disclosure.

FIG. 6 depicts an embodiment of a lens assembly 606 with two FTLs, whereby the first FTL 607 generates an optical response 609 by being driven by a, e.g., sinusoidal driving function 603 or a periodic pulse 603, corresponding to a sum of a limited number of Fourier components of the desired optical response 610. According to the chosen embodiment the limited number of Fourier components may include:

any one Fourier component;
the fundamental component (i.e., the first component of the Fourier series of the where the frequency $\omega_1$ is greater than 0), wherein the frequency $\omega_1$ 604 is the inverse of the period of the desired optical response and is consequently named fundamental frequency;
only odd (1, 3, 5, . . . ) components;
only even (2, 4, 6, . . . ) components;
less than 10 or less than 5 components.

The second FTL 608 then compensates for the residual components left by the first FTL by generating an optical response 611 approximating another sum of Fourier components taken from this residual set of components. In order to minimize this residual, the first FTL may be driven with an according control signal 603.

The controller frequencies $\omega_1$ 604 and $\omega_2$ 613 correspond to or are near the fundamental or resonance frequency $\eta_1$ and $\eta_2$ of the first 607 and the second 608 FTL. The frequency $\omega_1$ is the fundamental frequency (inverse of the period) of the desired optical response of the lens assembly, and $\omega_2$ is the main or lowest frequency of the residual Fourier components of the lens assembly's desired optical response. Because the physical properties of each of the two FTLs 607 and 608 have to be chosen in a way to provide a satisfactory optical response for a plurality of frequencies corresponding to the Fourier components "assigned" to each of the two FTLs, the difference between frequencies $\omega_1$ and $\eta_1$ (if any) and frequencies on $\omega_1$ and $\eta_2$ (if any), and hence first phase lag $\phi_1$ 605 and second phase lag $\phi_2$ 612, might not be the same. Due to this circumstance, the signal generators 601 and 615 driving each of the two FTLs comprise phase controllers 602 and 614, which each compensate for the phase lags $\phi_1$ and $\phi_2$ between the main (lowest) frequencies $\omega_1$ 604 and $\omega_2$ 613 of the control signals 603, 616 and the according optical first 609 and second response 611.

Figure 7:
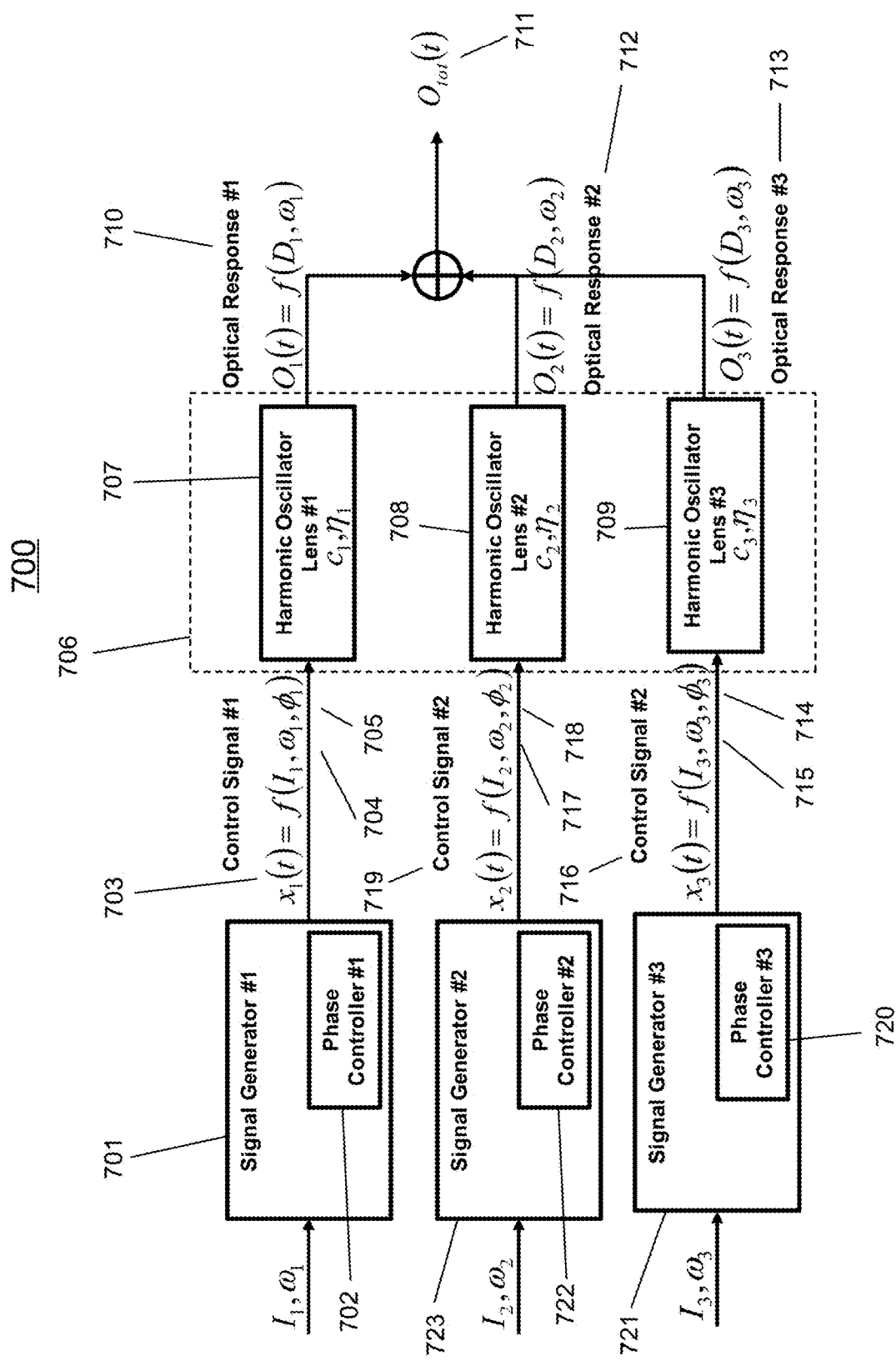
FIG. 7 shows an example of a lens assembly of three FTLs according to an embodiment of the disclosure.

FIG. 7 depicts an embodiment of a lens assembly 706 with three FTLs 707, 708 and 709, whereby a first FTL 707 generates an optical response 710 by being driven by a e.g. sinusoidal driving function 703 or a periodic pulse 703, corresponding to a sum of a limited number of Fourier components of the desired optical response 711. The second FTL 712 in the lens assembly generates an optical response 712 approximating the sum of some of the remaining Fourier components in order to compensate for the residual of the first FTL 707, while not necessarily "covering" all remaining Fourier components as is the aim of the embodiment shown in FIG. 6. The third FTL 709 of the lens assembly 706 then generates an optical response 713 approximating the sum of the remaining Fourier components in order to compensate for the residual of the first 707 and second 708 FTL. Similarly, the Fourier components may include the components described for FIG. 6 in the bullet point section above.

Again, it is to be noted that fundamental frequencies $\omega_1$, $\omega_2$, and $\omega_3$, referenced in FIG. 7 by numbers 704, 717 and 715, at which the first, the second and third FTL 707, 708 and 709 are driven, correspond to or are near the fundamental or resonance frequencies $\eta_1$, $\eta_2$, and $\eta_3$ of the first, the second and the third FTL. Consequently, as has been elaborated above for the scenario in FIG. 6, three signal generators 701, 723 and 721 are disposed for each of the three FTLs, whereby each signal controller comprises a respective phase controller 702, 722 and 720. Each phase controller compensates for the respective phase lags $\phi_1$, $\phi_2$ and $\phi_3$, referenced in FIG. 7 by numbers 705, 718 and 714, between the respective main (lowest) frequencies $\omega_1$, $\omega_2$ and $\omega_3$ of the control signals 703, 719 and 716 and the according optical responses 710, 712 and 713.

The disclosure also includes a method 800, which is shown in FIG. 8. The method 800 includes a step 801 of controlling an optical power of a lens assembly, which comprises a plurality of focus tunable lenses, FTLs, coaxially disposed along an optical axis of the lens assembly. The method 800 also includes a step 802 of applying to each FTL a respective control signal, thereby generating a periodic optical response of the respective FTL, wherein the optical response of each FTL contributes to the optical power of the lens assembly and is substantially different from the optical response from any other FTL of the plurality of FTLs.

The detailed description and the figures show that an optical system of separately controlled FTLs, which are placed separately and coaxially along an optical axis of an optical system can produce an ideal optical step response or at least a close approximation thereof. Each FTL is thereby driven by signal generator to produce a periodic optical response, which corresponds to a number of Fourier components of the ideal optical step response. The sum of all Fourier components guarantees the generation of a desired ideal optical step response and annihilation of oscillation artifacts and signal delays.

The invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A focus tunable optical system, comprising:
   a lens assembly comprising a plurality of focus tunable lenses (FTLs) coaxially disposed along an optical axis, each of the FTLs contributing to an optical power of the lens assembly; and
   a controller configured to control the optical power of the lens assembly by respectively applying to each of the FTLs a respective control signal, thereby generating a periodic optical response of each of the respective FTLs,
   wherein the respective optical response of each of the FTLs is substantially different from the respective optical response of any other FTL of the plurality of FTLs,
   wherein the controller is configured to perform a Fourier analysis of a desired optical response and to generate for each or one or more of the FTLs the respective control signal in proportion to a sum of one or more Fourier components of the desired optical response.

2. The focus tunable optical system according to claim 1, wherein the optical response of a FTL, of the FTLs, comprises a natural frequency of the FTL.

3. The focus tunable optical system according to claim 1, wherein the optical response of a FTL, of the FTLs, comprises a frequency lower than a natural frequency of the FTL.

4. The focus tunable optical system according to claim 1, wherein for each or one or more of the FTLs, the optical response of each of the respective FTLs comprises one or more Fourier components of an optical response of the lens assembly.

5. The focus tunable optical system according to claim 1, wherein the optical response of one of the FTLs comprises a lowest Fourier component of an optical response of the lens assembly.

6. The focus tunable optical system according to claim 1, wherein for each or one or more of the FTLs, the optical response of each of the respective FTLs comprises only odd Fourier components or only even Fourier components of an optical response of the lens assembly.

7. The focus tunable optical system according to claim 1, wherein for each or one or more of the FTLs, the optical response of each the respective FTLs comprises less than 10 Fourier components of an optical response of the lens assembly.

8. The focus tunable optical system according to claim 7, wherein for each or one or more of the FTLs, the optical response of each the respective FTLs comprises less than 5 Fourier components of the optical response of the lens assembly.

9. The focus tunable optical system according to claim 1, wherein:
   the plurality of FTLs comprises a first FTL, a second FTL, and a third FTL,
   the optical response of the first FTL approximates a first sum of a number of Fourier components of a desired optical response of the lens assembly,
   the optical response of the second FTL approximates a second sum of a subset of the remainder of the Fourier components of the desired optical response of the lens assembly to compensate for a first residual of the first FTL,
   the optical response of the third FTL approximates a third sum of the remaining Fourier components of the desired optical response of the lens assembly to compensate for a second residual of the second FTL, and a sum of the respective optical response of each of the first FTL, the second FTL, and the third FTL approximates the desired optical response.

10. The focus tunable optical system according to claim 1, wherein an optical response of the lens assembly is a periodic staircase function or an approximation of a periodic staircase function.

11. A multifocal display device, comprising: the focus tunable optical system according to claim 1.

12. A method for controlling a focus tunable optical system, the method comprising:
controlling an optical power of a lens assembly, which comprises a plurality of focus tunable lenses (FTLs) coaxially disposed along an optical axis of the lens assembly; and
respectively applying to each of the FTLs a respective control signal, thereby generating a periodic optical response of each of the respective FTLs,
wherein the optical response of each of the FTLs contributes to the optical power of the lens assembly and is substantially different from the optical response from any other FTL of the plurality of FTLs,
the method further comprises performing a Fourier analysis of a desired optical response and to generating for each or one or more of the FTLs the respective control signal in proportion to a sum of one or more Fourier components of the desired optical response.

13. A tangible, non-transitory computer-readable medium comprising a program code for controlling a focus tunable optical system according to the method of claim 12.

14. A focus tunable optical system, comprising:
a lens assembly comprising a plurality of focus tunable lenses (FTLs) coaxially disposed along an optical axis, each of the FTLs contributing to an optical power of the lens assembly; and
a controller configured to control the optical power of the lens assembly by respectively applying to each of the FTLs a respective control signal, thereby generating a periodic optical response of each of the respective FTLs,
wherein the respective optical response of each of the FTLs is substantially different from the respective optical response of any other FTL of the plurality of FTLs,
wherein the plurality of FTLs comprises a first FTL, a second FTL, and a third FTL,
wherein the optical response of the first FTL approximates a first sum of a number of Fourier components of a desired optical response of the lens assembly,
wherein the optical response of the second FTL approximates a second sum of a subset of the remainder of the Fourier components of the desired optical response of the lens assembly to compensate for a first residual of the first FTL,
wherein the optical response of the third FTL approximates a third sum of the remaining Fourier components of the desired optical response of the lens assembly to compensate for a second residual of the second FTL, and
wherein a sum of the respective optical response of each of the first FTL, the second FTL, and the third FTL approximates the desired optical response.

* * * * *